Figures 1, 2:
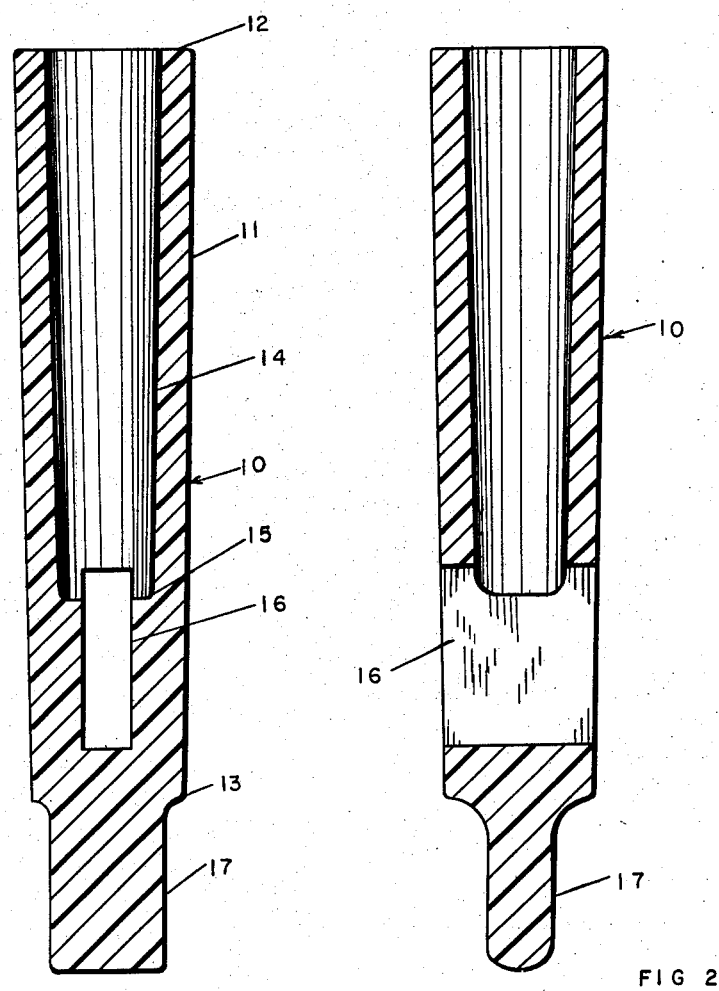

March 24, 1959     R. L. SWANSON     2,879,069

DRILL CHUCK

Filed March 21, 1956

INVENTOR.
RICHARD L. SWANSON
BY
*Charles L. Lovercheck*
*attorney*

United States Patent Office 2,879,069
Patented Mar. 24, 1959

2,879,069

DRILL CHUCK

Richard L. Swanson, Erie, Pa.

Application March 21, 1956, Serial No. 572,873

5 Claims. (Cl. 279—103)

This invention relates to tool holders and more particularly to drill chucks which are commonly used in drilling machines for holding twist drills and in milling machines and the like for holding arbors, etc.

In the prior art, the spindles of drilling machines usually have openings to receive the tapered shanks of twist drills made to fit the female taper in the drill spindle. Lathe tailstocks also have similar tapers. Also, milling machines and other machines of this type have arbors which have tapered sockets therein to receive a tapered end of a mandrel. These chucks and arbors are usually made of steel, highly finished, and very accurately conforming to the shape and size of the openings in which they are to be received. Both the opening and the chuck must be in a highly finished precision fit. In the use of tapered drill chucks made of steel, the drill is held rigidly and when the drill bit bores through an object and comes through the other side, the bit has a tendency to catch on the edges of the material and most of the resulting shock must be absorbed by the drill bit itself. Since the chuck holds the shank of the drill bit positively in the rigid drill spindle, this results in a large percentage of drill breakage.

It is, accordingly, an object of this invention to overcome the above and other defects in prior drill chucks and similar devices and, more particularly, it is an object of this invention to provide a drill chuck which is simple in construction, economical to manufacture, and simple and efficient to use.

Another object of the invention is to provide a drill chuck made of nylon which overcomes the above and other disadvantages in prior drill chucks.

A further object of this invention is to provide a drill chuck made of a plastic material having an extremely high tensile strength and a low elasticity.

A still further object of the invention is to provide a drill chuck made of plastic material having the properties of high tensile strength, no plastic deformation, rigidity, and low elasticity.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a longitudinal cross sectional view of the drill chuck shown in Fig. 2; and Fig. 2 is a longitudinal cross sectional view of the drill chuck shown in Fig. 1.

Now with more specific reference to the drawing, a drill chuck 10 is shown having a shank portion 11 with an outer tapered surface tapering from an end 12 to an end 13 in a taper which may be any of the standard tapers commonly in use in machine shops and other similar environments. The shank 11 is hollow and has an inside taper 14 which tapers from the end 12 inwardly toward an end 15.

A transversely extending keyway 16 is formed in the shank 11 adjacent a key 17, the keyway 16 being adapted to receive the key 17 on the end of the drill bit, mandrel, or the like. The keyway 16 may receive a drift pin for driving the drill bit or similar article from the taper 14 in the ordinary manner. The keyway 16 is disposed at the end of the taper 14.

The entire drill chuck 10 is molded of nylon; however, it could be made of a plastic material which has similar properties to nylon, that is, high tensile strength, low deformation, low elasticity, and high rigidity. Elasticity is used herein in its popular sense; that is, a body having high elasticity is easily deformed and quick in recovery such as rubber. In the popular sense, an example of a body having low elasticity is steel. Nylon also has low elasticity. In the ordinary plastics now commercially available, it has been found that nylon has more nearly the optimum characteristics to render it most suitable for use as a drill chuck.

By use of nylon in the present environment, it has been discovered that drill breakage can be reduced as much as fifty to seventy-five percent over the breakage resulting from the use of a steel drill chucks. When the drill strikes an obstruction or catches, the nylon itself will deflect a small amount, thus helping to free the drill. If this deflection does not allow the drill to free itself and the drill remains caught, a slippage will occur between the drill and the sleeve and, also, between the sleeve and the internal surface of the spindle supporting the drill. Since the key 17 is held positively in the machine spindle, a twisting motion will be introduced in the nylon sleeve. If the drill has not freed itself by this time, the key 17 of the nylon chuck may shear off, thus protecting the drill. In the case of large sized drills, the drill itself is much more expensive than the chuck. Thus, a saving results. When a drill breaks which is held in an ordinary steel drill chuck, the chuck usually breaks also. The steel drill chucks are considerably more expensive than the present nylon chucks and, therefore, a considerable saving results.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A hollow chuck for a machine tool made of nylon having an internal tapered surface, said hollow in said chuck adapted to receive and frictionally engage the tapered surface of a shaft to transmit torque between said chuck and said shaft, and an outside surface adapted to be received in an internally tapered member whereby said internal tapered surface of said chuck is adapted to be urged into frictional engagement with said shaft.

2. A hollow chuck for a machine tool made of a plastic having high tensile strength and low resilient deformation having an external tapered surface, said hollow in said chuck adapted to receive and frictionally engage the tapered end of a shaft to transmit torque between said chuck and said shaft, said external tapered surface being adapted to be received in a tapered surface whereby said plastic is deflected and urged into frictional engagement with said shaft to restrain said shaft to rotate with said chuck.

3. A hollow chuck for a machine tool comprising an elongated body made of nylon, said hollow comprising an internal opening therein terminating at the inner end thereof in a keyway, said keyway extending transversely through said chuck and communicating with said hollow therein, the walls of said hollow being adapted to receive and frictionally engage a male tapered article, said chuck having an external surface adapted to be received in an internally tapered member, said internally tapered member urging said internal opening of said hollow into engagement with a member disposed therein.

4. The chuck recited in claim 3 wherein said chuck terminates at the small end in a key rectangular in cross section and said keyway is disposed through said chuck perpendicular to the longer sides of said rectangular key.

5. A chuck for a machine tool, said chuck being made of nylon having a portion flat on two sides thereof comprising a key on one end and an external surface tapering away from said key, and a hollow internally tapered surface formed in said chuck, the walls of said hollow defining a tool receiving opening having tapered walls tapering outwardly away from said key adapted to frictionally engage the tapered surface of a tool whereby torque is transmitted between said chuck and said tool, said external surface overlying said internally tapered surface and adapted to be received in a hollow member whereby said internally tapered surface will be urged into frictional engagement with a tool held therein.

References Cited in the file of this patent

UNITED STATES PATENTS

| | | |
|---|---|---|
| 628,927 | Ducharme | July 18, 1899 |
| 988,355 | Knight | Apr. 4, 1911 |
| 2,759,734 | Velepec | Aug. 21, 1956 |
| 2,804,290 | Kaufman | Aug. 27, 1957 |